（12） United States Patent
Berlin (10) Patent No.: US 10,533,030 B2
(45) Date of Patent: *Jan. 14, 2020

(54) CARBON FIBRE COMPOSITIONS COMPRISING LIGNIN DERIVATIVES

(71) Applicant: SUZANO CANADA INC., Burnaby (CA)

(72) Inventor: Alex Berlin, Burnaby (CA)

(73) Assignee: SUZANO CANADA INC., Burnaby, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,607

(22) Filed: Jun. 9, 2016

(65) Prior Publication Data

US 2016/0280730 A1 Sep. 29, 2016

Related U.S. Application Data

(63) Continuation of application No. 13/584,616, filed on Aug. 13, 2012, now Pat. No. 9,376,536, which is a
(Continued)

(51) Int. Cl.
*C07G 1/00* (2011.01)
*D01F 9/17* (2006.01)
(Continued)

(52) U.S. Cl.
CPC ............ *C07G 1/00* (2013.01); *C08H 6/00* (2013.01); *C08H 8/00* (2013.01); *C08L 97/005* (2013.01); *D01F 9/17* (2013.01)

(58) Field of Classification Search
CPC .... C07G 1/00; C08H 6/00; C08H 8/00; C08L 97/005
See application file for complete search history.

(56) References Cited

U.S. PATENT DOCUMENTS 1,358,164 A 11/1920 Kottinger
2,934,531 A 4/1960 Gordon et al.
(Continued)

FOREIGN PATENT DOCUMENTS

CA 1136326 A1 11/1982
CA 1201115 A 2/1986
(Continued)

OTHER PUBLICATIONS

Uraki, Y., et al. "Preparation of carbon fibers from organosolv lignin obtained by aqueous acetic acid pulping." Holzforschung-International Journal of the Biology, Chemistry, Physics and Technology of Wood 49.4 (1995): 343-350.*
(Continued)

*Primary Examiner* — Nicholas E Hill
(74) *Attorney, Agent, or Firm* — Perkins Coie LLP; Viola T. Kung (57) ABSTRACT

The present disclosure provides derivatives of native lignin suitable for production of carbon fibres wherein the derivatives of native lignin have a certain alkoxy content and/or a certain carbon content. The present lignin derivatives can have acceptable spinnability performance characteristics for producing carbon fibres having acceptable tensile strengths and acceptable modulus of elasticity.

14 Claims, 4 Drawing Sheets

Related U.S. Application Data continuation of application No. PCT/CA2011/000184, filed on Feb. 15, 2011.

(60) Provisional application No. 61/304,752, filed on Feb. 15, 2010.

(51) Int. Cl.
   *C08H 8/00*   (2010.01)
   *C08L 97/00*  (2006.01)
   *C08H 7/00*   (2011.01)

(56) References Cited

U.S. PATENT DOCUMENTS

| | | |
|---|---|---|
| 2,977,352 A | 3/1961 | Gardon et al. |
| 3,461,082 A * | 8/1969 | Fukuoka .................. D01F 9/17 264/DIG. 19 |
| 3,546,199 A | 12/1970 | Christian |
| 3,585,104 A | 6/1971 | Kleinert |
| 4,100,016 A | 7/1978 | Diebold et al. |
| 4,279,788 A | 7/1981 | Lambuth |
| 4,326,036 A | 4/1982 | Hayes |
| 4,409,032 A | 10/1983 | Thermoform |
| 4,470,851 A | 9/1984 | Paszner et al. |
| 4,486,557 A | 12/1984 | Gaul et al. |
| 4,594,130 A | 6/1986 | Chang |
| 4,764,596 A | 8/1988 | Lora et al. |
| 4,918,167 A | 4/1990 | Glasser et al. |
| 4,964,596 A | 10/1990 | Ganssle et al. |
| 4,968,771 A | 11/1990 | Baxter |
| 5,173,527 A | 12/1992 | Calve |
| 5,196,460 A | 3/1993 | Lora et al. |
| 5,202,403 A | 4/1993 | Doering |
| 5,223,601 A | 6/1993 | Chum et al. |
| 5,344,921 A | 9/1994 | Sudo et al. |
| 5,373,070 A | 12/1994 | Gardziella et al. |
| 5,382,608 A | 1/1995 | Gardzielia et al. |
| 5,411,594 A | 5/1995 | Brelsford |
| 5,424,417 A | 6/1995 | Torget et al. |
| 5,681,427 A | 10/1997 | Lora et al. |
| 5,730,837 A | 3/1998 | Black et al. |
| 5,756,098 A | 5/1998 | Price et al. |
| 5,788,812 A | 8/1998 | Agar et al. |
| 5,879,463 A | 3/1999 | Proenca |
| 5,911,276 A | 6/1999 | Kieke |
| 5,916,780 A | 6/1999 | Foody et al. |
| 6,022,419 A | 2/2000 | Torget et al. |
| 6,039,276 A | 3/2000 | Hatt et al. |
| 6,172,204 B1 | 1/2001 | Sarkanen et al. |
| 6,172,272 B1 * | 1/2001 | Shabtai .................. C10G 1/002 208/108 |
| 6,179,958 B1 | 1/2001 | Lysen et al. |
| 6,228,177 B1 | 5/2001 | Torget |
| 6,258,175 B1 | 7/2001 | Lightner |
| 6,281,328 B1 | 8/2001 | Sartori et al. |
| 6,342,378 B1 | 1/2002 | Zhang et al. |
| 6,464,827 B1 | 10/2002 | Colodette |
| 6,555,350 B2 | 4/2003 | Ahring et al. |
| 6,632,286 B2 | 10/2003 | Converse |
| 6,632,931 B1 * | 10/2003 | Funaoka .................. C08H 6/00 530/502 |
| 7,189,306 B2 | 3/2007 | Gervais |
| 7,413,662 B2 | 8/2008 | Eriksen et al. |
| 7,413,882 B2 | 8/2008 | Berka et al. |
| 7,465,791 B1 | 12/2008 | Hallberg et al. |
| 7,649,086 B2 | 1/2010 | Belanger et al. |
| 7,947,182 B2 | 5/2011 | Gong |
| 7,959,765 B2 | 6/2011 | Argyropoulos |
| 8,067,193 B2 | 11/2011 | Hughes et al. |
| 8,193,324 B2 | 6/2012 | Hallberg et al. |
| 8,227,004 B2 | 7/2012 | Hallberg et al. |
| 8,288,460 B2 | 10/2012 | Balakshin et al. |
| 8,378,020 B1 | 2/2013 | Balakshin et al. |
| 8,399,688 B2 | 3/2013 | Dumesic et al. |
| 8,426,502 B2 | 4/2013 | Balakshin et al. |
| 8,431,635 B2 | 4/2013 | Balakshin et al. |
| 8,445,562 B2 | 5/2013 | Balakshin et al. |
| 9,376,536 B2 * | 6/2016 | Berlin ...................... C07G 1/00 |
| 2002/0069987 A1 | 6/2002 | Pye |
| 2002/0143085 A1 | 10/2002 | Yoshida et al. |
| 2003/0070995 A1 | 4/2003 | Breitenbeck |
| 2005/0234156 A1 | 10/2005 | Thames et al. |
| 2006/0264519 A1 | 11/2006 | Eckert et al. |
| 2007/0034345 A1 | 2/2007 | Petrus et al. |
| 2007/0141691 A1 | 6/2007 | Hiri |
| 2007/0172913 A1 | 7/2007 | Hughes et al. |
| 2007/0259412 A1 | 11/2007 | Belanger |
| 2008/0021155 A1 | 1/2008 | Bono et al. |
| 2008/0115415 A1 | 5/2008 | Agrawal et al. |
| 2008/0262182 A1 | 10/2008 | Funaoka |
| 2008/0295980 A1 | 12/2008 | Hallberg et al. |
| 2008/0299629 A1 | 12/2008 | Hallberg |
| 2008/0317661 A1 | 12/2008 | Eckert et al. |
| 2009/0062516 A1 | 3/2009 | Belanger et al. |
| 2009/0062581 A1 | 3/2009 | Appel et al. |
| 2009/0069550 A1 | 3/2009 | Belanger et al. |
| 2009/0117226 A1 | 5/2009 | Hallberg et al. |
| 2009/0118477 A1 | 5/2009 | Hallberg et al. |
| 2010/0051558 A1 | 3/2010 | Gong |
| 2010/0071829 A1 | 3/2010 | Tanzer et al. |
| 2010/0159517 A1 | 6/2010 | Diner et al. |
| 2010/0305242 A1 | 12/2010 | Balakshin et al. |
| 2010/0305243 A1 | 12/2010 | Balakshin et al. |
| 2010/0305244 A1 | 12/2010 | Balakshin et al. |
| 2010/0311943 A1 | 12/2010 | Lallave Rivas et al. |
| 2011/0091711 A1 | 4/2011 | Neivandt et al. |
| 2011/0236946 A1 | 9/2011 | Maclachlan et al. |
| 2011/0252701 A1 | 10/2011 | Soane et al. |
| 2012/0136097 A1 | 5/2012 | Berlin |
| 2012/0237980 A1 | 9/2012 | Hallberg et al. |
| 2012/0247617 A1 | 10/2012 | Berlin et al. |
| 2013/0168323 A1 | 7/2013 | Soane et al. |
| 2013/0204039 A1 | 8/2013 | Runge |
| 2013/0228298 A1 | 9/2013 | Balakshin et al. |
| 2014/0346395 A1 | 11/2014 | Balakshin et al. |

FOREIGN PATENT DOCUMENTS

| | | |
|---|---|---|
| CA | 1230592 A | 12/1987 |
| CA | 1278294 C | 12/1990 |
| CA | 2043399 | 11/1991 |
| CA | 2214013 C | 7/1997 |
| CA | 1339664 C | 2/1998 |
| CA | 2419658 A1 | 3/2002 |
| CA | 2611152 A1 | 12/2006 |
| CA | 2661202 A1 | 3/2008 |
| CA | 2676982 A1 | 8/2008 |
| CA | 2597135 A1 | 9/2008 |
| CA | 2687916 A1 | 12/2008 |
| CA | 2696268 A1 | 2/2009 |
| CA | 2697469 A1 | 3/2009 |
| CA | 2743052 A1 | 6/2010 |
| CA | 2715458 A1 | 10/2010 |
| CA | 2798268 C | 8/2011 |
| CA | 2803177 A1 | 1/2012 |
| CN | 1766000 A | 5/2006 |
| CN | 101711229 A | 5/2010 |
| CN | 101711263 A | 5/2010 |
| DE | 199 52 563 A1 | 5/2001 |
| DE | 20 2008 001 703 U1 | 5/2008 |
| EP | 0105937 A1 | 4/1984 |
| EP | 0038677 B1 | 7/1984 |
| EP | 0224721 A1 | 6/1987 |
| EP | 0461463 A2 | 12/1991 |
| EP | 0485150 A1 | 5/1992 |
| EP | 0737253 A1 | 10/1996 |
| EP | 2150572 A1 | 2/2010 |
| EP | 2173889 A1 | 4/2010 |
| GB | 2439135 A | 12/2007 |
| JP | 2007284337 A | 11/2007 |
| JP | 2008005832 A | 1/2008 |
| SE | 527646 C2 | 5/2006 |
| WO | 199315261 A1 | 8/1993 |

(56) References Cited

FOREIGN PATENT DOCUMENTS

| | | | |
|---|---|---|---|
| WO | 200075153 A1 | 12/2000 | |
| WO | 2007129921 A1 | 11/2007 | |
| WO | 2008008793 A1 | 1/2008 | |
| WO | 2008137639 A1 | 11/2008 | |
| WO | WO-2008144878 A1 | 12/2008 | |
| WO | WO-2008144903 A1 | 12/2008 | |
| WO | WO-2009003292 A1 | 1/2009 | |
| WO | WO-2009/028969 A1 | 3/2009 | |
| WO | WO-2010060183 A1 | 6/2010 | |
| WO | WO-2010081231 A1 | 7/2010 | |
| WO | 2010135804 A1 | 12/2010 | |
| WO | 2010135805 A1 | 12/2010 | |
| WO | 2010135806 A1 | 12/2010 | |
| WO | 2010135807 A1 | 12/2010 | |
| WO | 2010135833 A1 | 12/2010 | |
| WO | WO-2010/135832 A1 | 12/2010 | |
| WO | 2011/028554 A1 | 3/2011 | |
| WO | 2011026243 A1 | 3/2011 | |
| WO | WO-2011028554 A1 * | 3/2011 | ............... D21C 1/00 |
| WO | 2011097719 A1 | 8/2011 | |
| WO | 2011097720 A1 | 8/2011 | |
| WO | 2011097721 A1 | 8/2011 | |
| WO | 2011106879 A1 | 9/2011 | |
| WO | 2011/150504 A1 | 12/2011 | |
| WO | 2012000093 A1 | 1/2012 | |
| WO | 2012031356 A1 | 3/2012 | |
| WO | 2012037668 A1 | 3/2012 | |
| WO | 2012126099 A1 | 9/2012 | |
| WO | 2012129652 A1 | 10/2012 | |
| WO | 2014094104 A1 | 6/2014 | |

OTHER PUBLICATIONS

Ragnar, M., et al. "Pulp," Ullmann's Encyclopedia of Industrial Chemistry, published online 2000, 89 pages.*
Pan, Xuejun, et al. "Organosols ethanol lignin from hybrid poplar as a radical scavenger: relationship between lignin structure, extraction conditions, and antioxidant activity." Journal of agricultural and food chemistry 54.16 (2006): 5806-5813.*
Friedrich Emil Brauns, The Chemistry of Lignin 239 (1952).*
Akim et al.: "13C NMR of Lignins in Aqueous Alkali", Holzforschung, 51 (1997) 419-427.
Alfani F et al: "Comparison of SHF and SSF processes for the bioconversion of steam-exploded wheat straw", Journal of Industrial Microbiology and Biotechnology, vol. 25, No. 4, Oct. 2000 (Oct. 2000), pp. 184-192, XP002676900.
Arato C. et al. The Lignol approach to biorefining of woody biomass to produce ethanol and chemicals. Applied Biochemistry and Biotechnology—Part A Enzyme Engineering and Biotechnology Mar. 2005 (Mar. 2005), vol. 123 (1-3), pp. 871-882, ISSN: 0273-2289.
Baugh et al. Thermochemical Pretreatment of Lignocellulose to Enhance Methane Fermentation: II. Evaluation and Application of Pretreatment Model, Biotechnology and Bioengineering, vol. 31, pp. 62-70, 1988.
Brosse, N et al. "Dilute Sulphuric acid and ethanol Organosolv Pretreatment of Miscanthus x Gigan-teus" Celluose Chemistry and Technology 2010, 44, 71-78.
Brosse, N et al. "Pretreatment of Miscanthus x giganteus Using the Ethanol Organolsolv Process for Ethanol Production". hid. Eng. Chem. Res. 2009, 8328-8334.
Chandel, et al. "Bioconversion of pentose sugars into ethanol: A review and future directions" Biotechnology and Molecular Biology Review vol. 6(1), pp. 008-020, Jan. 2011.
Datar, Rohit, et al. "Hydrogen Production from the Fermentation of Corn Stover Biomass Pretreated with a SteamExplosion Process," International Journal of Hydrogen Energy, vol. 32, 13 Nov. 2006, pp. 932-939, XP022094535.
Dominguez, et al.; "Thermal Stability and Pyrolysis Kinetics of Organosolv Lignins Obtained from Eucalyptus Globulus"; Industrial Crops and Products; vol. 27, No. 2, pp. 150-156 (Dec. 21, 2007).

Dr. W. Smith, "Mapping the Development of UK Biorefinery Complexes (NFC07/008)" A Report Prepared for , Tamutech Consultancy, May 2007, 80 pages.
El Hage, R et al. "Characterization of milled wood lignin and ethanol organosolv lignin from miscan-thus". Polymer Degradation and Stability 2009, 94, 1632-1638.
El Hage, R et al. "Effect of the Pre-Treatment Severity on the Antioxidant Properties of Ethanol Organosolv Miscanthus x giganteus Lignin". Natural Resources 2012 (on-line Jun. 2012), 3, 29-34.
El Hage, R et al. "Effects of process severity on the chemical structure of Miscanthus Ethanol organosolv lignin". Polymer Degradation and Stability 2010, 95, 997-1003.
Enoki, A. et al. "Degredation of the Lignin Model Compounds 4-Ethoxy-3METHOXYPHENYLGLYCOL 3-Guaiacyl and Vanillic Acid Ethers by Phanerochaete Chrysosporium", FEMS Microbiology Letters 10, 1981, p. 373.
Ghatak et al: "Spectroscopic comparison of lignin separated by electrolysis and acid precipitation of wheat straw soda black liquor", Industrial Crops and Products, Elsevier, NL, vol. 28, No. 2, Sep. 1, 2008 (Sep. 1, 2008), pp. 206-212, XP023178276.
Girisuta B. et al. A Kinetic Study on the Conversion of Glucose to Levulinic Acid. Icheme Part A 84(A5)339-349, May 2006.
Girisuta B. Levulinic Acid from Lignocellulosic Biomass. Dissertation Aug. 15, 1975, University of Groningen.
Gosselink et al.: "Analytical protocols for characterization of sulphur-free lignin". Industrial crops and Products 2004, 19, 271-281.
Gosselink, RJA. "Lignin as a reneweable aromatic resource for the chemical industry" Thesis Ibr the degree of doctor at Wageningen University. Dec. 2011, 1-191.
Gregorova, A. et al. "Radical Scavenging Capacity of Lignin and Its Effect on Processing Stabilization of Virgin and Recycled Polypropylene", Journal of Applied Polymer Science, 2007, vol. 106, Issue 3, pp. 1626-1631.
Hahn-Hagerdal et al., "Ethanolic Fermentation of Pentoses in Lignocellulose Hydrolysates, Applied Biochemistry and Biotechnology", vol. 28/29, 1991, 131-144.
Hu, G et al. "Structural Characterization of Switchgrass Lignin atter Ethanol Organosolv Pre-treatment". Energy Fuels 2012 (published Dec. 22, 2011) 26, 740-745.
Hussein, et al; "Oil Spill Sorption using Carbonized Pith Bagasse: Trial for Practical Application"; Int. J. Environ. Tech.; vol. 5, No. 2, pp. 233-242 (Mar. 10, 2008).
Jahan, MS et al. "Isolation and Characterization of Lignin from Tropical and Temperate Hardwood" Bangladesh J. Sci. Ind. Res. 2009, 44(3), 271-280.
Jeffries, "Comparison of Alternatives for the Fermentation of Pentoses to Ethanol by Yeasts" In: Lowenstein, M ichael Z., ed. Energy applications of biomass: Proceedings of the National Meeting on Biomass R & D for Energy Applications; Oct. 1-3, 1984; Arlington, VA. New York, NY: Elsevier Applied Science Publishers; 1985 : 231-252.
Katzen, R., "Extraction of Lignin from Hydrolyzed Lignocellulose," Ind. Engg. Chem., Dec. 1945, pp. 1218-1222.
Keating Jeffrey D et al: "Tolerance and adaptation of ethanologenic yeasts to lignocellulosic inhibitory compounds", Biotechnology and Bioengineering, vol. 93, No. 6, Apr. 2006 (Apr. 2006), pp. 1196-1206, XP002676901, ISSN: 0006-3592.
Keating, J. D., et al. "An Ethanologenic Yeast Exhibiting Unusual Metabolism in the Fermentation of Lignocellulosic Hexose Sugars", Journal of Industrial Microbiology and Biotechnology, 2004, 31, 235-244.
Kim et al. "Simultaneous consumption of pentose and hexose sugars: an optimal microbial phenotype for efficient fermentation of lignocellulosic biomass" Appl Microbiol Biotechnol (2010) 88:1077-1085.
Kim et al.; "Preliminary Study on Converting Hybrid Poplar to High-Value Chemicals and Lignin Using Organosolv Ethanol Process", Ind. Eng. Chem. Res., Oct. 26, 2010, vol. 49, pp. 12156-12163.
Knutsen, J. and Davis, R.: "Cellulase retention and sugar removal by membrane ul-trafiltration during lignocellulosic biomass hydrolysis", Applied Biochemistry and Biotechnology, 2004, vol. 113-116, pp. 585-599, ISSN: 0273-2289.

(56) References Cited

OTHER PUBLICATIONS

Kosa et al. "Characterization of LignoBoost lignin to predict possible utilization". Presentation, Jul. 17, 2009 http/Avww.ipst.gatech.edu/faculty new/faculty bios/ragauskas/student presentations/Kose%20Lignin-SCO.pdf.

Kues, Ursula (Ed.), "Wood Production, Wood Technology and Biotechnological Impacts ", Jan. 1, 2007 (Jan. 1, 2007), Gottingen : Univ.-Verl. Gottingen, 2007, DE, p. 448.

Kurabi, A., et al. "Enzymatic Hydrolysis of Steam-Exploded and Ethanol Organosolv-Pretreated Douglas-Fir by Novel and Commercial Fungal Cellulases," App. Biochem. Biotech., vol. 121-124, 2005, 219-230.

Liu, H. et al.: "Study on preparation and application in flocculants of modified lignin", Modern Applied Science, Feb. 2011 (Feb. 2011) vol. 5, No. 1, pp. 205-208, ISSN:1913-1844.

Luo, C., et al., "Identification of potential fermentation inhibitors in conversion of hybrid poplar hydrolyzate to ethanol," Biomass and Bioenergy, 2002, 22, 125-138.

Luo; "Lignin-Based Cargon Fiber—Thesis"; University of Maine (May 2010).

Mabee WE et al. Updates on softwood-to-ethanol process development. Applied Biochemistry and Biotechnology Mar. 2006 (Mar. 2006), vol. 129(1-3), pp. 55-70, ISSN: 0273-2289.

Mansson, P. "Quantitative Determination of Phenolic and Total Hydroxyl Groups in Lignin," Holzforschung, 1983, 37, 143-146.

Marchessault, R.H., "Chemrawn Again!," Cellulose, vol. 28 Jun. 2007, pp. 281-282, XP019524885.

Meier et al. On Properties and Degradability of Lignins, Isolated with Alcohol-Water Mixtures. Holzforschung vol. 35 (1981), Part 5, p. 247-252.

Nada A M A et al: "Infrared spectroscopic characteristics of bagasse cresol lignin", Polymer Degradation and Stability, Barking, GB, vol. 43, No. 1, 1 Jan. 1994 (Jan. 1, 1994), pp. 55-59, XP024144586.

Nenkova, et al.; "Study of the Sorption Properties of Technical Hydrolysis Lignin and Wool Shoddy Towards Oil Pollution"; Journal of the University of Chemical Technology and Metallurgy; vol. 43, No. 2, pp. 217-222 (2008).

Olempska-Beer, Z.: "Alpha-amylase from Bacillus licheniformis containing a genetical-ly engineered alpha-amylase gene from B. licheniformis (thermostable)", 61st JECFA-Chemical and Technical Assessments of Food Additives (CTA), 2004, pp. 1(6)-6(6).

Olson et al.: "Levulinate Esters from Biomass Wastes"; ACS Symposium Series, 2001, vol. 784, Chapter 5, pp. 51-63.

Palmqvist E et al: "Fermentation of Lignocellulosic Hydrolysates I: Inhibition and Detoxification", Bioresource Technology, Elsevier BV, GB, vol. 74, No. 1, Jan. 1, 2000 (Jan. 1, 2000), pp. 17-24, XP001016127.

Pan, X et al. "The Bioconversion of Mountain Pine Beetle-Killed Lodgepole Pine to Fuel Ethanol Using the Organolsolv Process". Biotechnology and Bioengineering 2008, 101(1). 39-48.

Pan, X.P. et al., "Bioconversion of Hybrid Poplar to Ethanol and Co-Products Using an Organosolv Fractionation Process: Optimization of Process Yields", Biotechnology and Bioengineering, vol. 94, No. 5, pp. 851-861, Aug. 5, 2006 (May 8, 2006), Published online Mar. 7, 006 (Jul. 3, 2006) in Wiley InterScience (www.interscience.wiley.com).

Pan, X.P. et al., "Pretreatment of Lodgepole Pine Killed by Mountain Pine Beetle Us-ing the Organosolv Process: Fractionation and Process Optimization", Ind. Eng. Chem. Res. 2007, 46, pp. 2609-2617, Published on Web Mar. 14, 2007 (Mar. 14, 2007).

Pasquini D et al: "Extraction of lignin from sugar cane bagasse and Pinus taeda wood chips using ethanol-water mixtures and carbon dioxide at high pressures", Journal of Supercritical Fluids, PRA Press, US, vol. 36, No. 1, Nov. 1, 2005 (Nov. 1, 2005), pp. 31-39, XP027818818, ISSN: 0896-8446.

Pye, E. Kendall et al. "The Alcell™ process a proven alternative to kraft pulping", Tappi Journal, Mar. 1991, pp. 113-117.

Said, et al.; "Usefulness of Raw Bagasse for Oil Absorption: A Comparison of Raw and Acylated Bagasses and their Components"; Bioresource Technology 100; pp. 2219-2222 (2009).

Sannigrahi, P et al. "Lignin Structural Modifications Resulting from Ethanol Organosolv Treatment of Lob-lolly Pine", Energy Fuels 2010, 24. Oct. 9, 2009, 683-689.

Sayed, et al.; "Oil Spill Pollution Treatment by Sorption on Natural Cynanchum Acutum L. Plant"; Journal of Applied Sciences & Environmental Management; vol. 7, No. 2, pp. 63-73 (Dec. 2003).

Shu-Bin Wu et al: "Chemical structures and thermochemical properties of bagasse lignin", Forestry Studies in China, Beijing Forestry University, Be, vol. 8, No. 3, Sep. 1, 2006 (Sep. 1, 2006), pp. 34-37, XP019440259.

Sidiras, D., et al., "Simulation of acid-catalysed organosolv fractionation of wheat straw," Bioresource Technology 94 (2004) 98.

Sun, X.-F., et al., "Extraction and characterization of original lignin and hemicelluloses from wheat straw," J. Agric. Food Chem., 2005, 53, 860-870.

Sun, et al.; "Acetylation of Rice Straw with or without Catalysts and its Characterization as a Natural Sorbent in Oil Spill Cleanup"; Journal of Agricultural and Food Chemistry; vol. 50, No. 22, pp. 6428-6433 (Oct. 1, 2002).

Taherzadeh, Mohammad J., et al. "Enzyme-Based Hydrolysis Processes for Ethanol from Lignocellulosic Materials: A Review," Bioresources, vol. 2, Nov. 2007, pp. 707-738, XP008130300.

Tai, D., et al. "Biodegradation of guaiacyl and guaiacyl-syringyl lignins in wood by Phanerochaete chrysosporium." Recent advances in lignin biodeterioration: proceedings of an international seminar, organized under the auspices of the US-Japan cooperative science program. Uni Publishers Co. Ltd. Uni Publishers, 1983.

Tanaka, M. et al.: "Removal of lignin and reuse of cellulases for continuous sacchari-fication of lignocelluloses", Biotechnology and Bioengineering, Sep. 20, 1988 (Sep. 20, 1988) vol. 32, No. 7, pp. 897-902, ISSN: 0006-3592.

Tejado et al., "Isocyanate curing of novolac-type ligon-phenol-formaldehyde resins", Industrial Crops and Products, vol. 27, No. 2, pp. 208-213, Dec. 21, 2007.

Tejado, A et al. "Physico-chemical characterization of lignins from different sources for use in phe-nol-formaldehyde resin synthesis" Bioresource Technology 2007, 98, 1655-1663.

Tolbert, A. et al. "Characterization and Analysis of the Molecular Weight of Lignin for Borefnng Studies," Biofuels, Bioprod. Bioref., 2014, Review, 21 pages.

Van Maris, Antonius J A, et al.: "Alcoholic fermentation of carbon sources in biomass hydrolysates by Saccharomyces cerevisiae: current status", Antonie Van Leeuwenhoek, Kluwer Academic Publishers, DO, vol. 90, No. 4, Oct. 11, 2006 (Oct. 11, 2006), pp. 391-418, XP019446684.

Vinardell; "Application of Lignins from Different Sources as Antioxidant"; Detergent & Cosmetics; vol. 31, No. 9, pp. 28-30 (Sep. 25, 2008). (English Abstract).

Wang, Y. et al.: "Application of a novel cationic polyacrylamide as flocculant in treat-ment of papermaking wastewater", Jun. 2010 (Jun. 2010) Bioinformatics and Bio-Medical Engineering, 2010 4th International Conference, pp. 1-4, ISSN: 2151-7614.

Wu, et al.; "Development of Lignin/Polyolefin Composites"; China Plastics Industry; vol. 37, No. 6, pp. 1-5 (Jun. 20, 2009). cited by applicant. (English Abstract).

Xia et al.: "Quantitative 13C NMR Analysis of Lignins with Internal Standards". J. Agric. Food Chem. 2001, 49, 3573-3378.

Xu et al., Catalytic Liquefaction of Hydrolytic Lignin in Supercritical Ethanol Solution (II): Effect of Reaction Time, Ratio of Solvent/HL & Atmosphere on Reaction, Acta Energiae Solaris Sinica, 28(7), p. 805-809—English Abstract.

Xu, F., et al., "Comparative study of organosolv lignins from wheat straw," Industrial Crops and Products 23 (2006) 180-193.

Xue, B-L et al. "Polyols Production by Chemical Modification of Autocatalyzed Ethanol-Water lignin from Betula Alnoides". Paper PS-79. Proceedings of the 55th International Convention of Society of IVood Science and Technology Aug. 27-31, 2012, Beijing, China.

Zhang et al. "Removal of Residual Lignin of Ethanol-Based Organosolv Pulp by an Alkalu Extraction Process," J. Applied Polymer Science, 2007, vol. 106, pp. 630.

Zhang, Yi-Heng et al. "Fractionating Recalcitrant Lignocellulose at Modest Reaction Conditions", Biotechnology and Bioengineering, vol. 97, No. 2, Jun. 1, 2007, pp. 214-223.

(56) References Cited

OTHER PUBLICATIONS

Zhou Xue-fei "AS-AQ Pulping of Eucalyptus Wood and the Structural Change of Lignin During Pulping". Chemistry and Industry of Forest Products 2004, 24, 107-110 (English Abstract).
"CINCALEHAH", Database Traditional Knowledge Digital Library, Database accession No. SJ/1103, Rasayoga Sagara—Compiled and Translated by Vaidya Pandita Hariprapanna Ji ,vol.-I : Krishnadas Academy, Varanasi, Edn. Reprint, 1999. p. 442-443.
"BALOOT", Database Traditional Knowledge Digital Library, Database accession No. AN4/83, Ali Ibn-e-Abbaas Majoosi; Kaamil-al-Sena'ah, Part I (10th century AD), Central Council for Research in Unani Medicine, 61-65 Institutional Area, Janak Puri, New Delhi-58, 2005 AD p. 190.
"Khadiraniryasa Rasa Prayoga", Database Traditional Knowledge Digital Library, Database accession No. RG1/1500, Cakraparlidattah; Cakradattah—Translated by Indradeva Tripathi; Chaukhamba Sanskrit Samsthan (Varanasi), Ed. 4th 2002. p. 285.
"Velli Parpam", Database Traditional Knowledge Digital Library, Database accession No. GP01/265, Therayar; Therayar Sekarappa Publisher: C.C.R.A.S, New Delhi.(Edn: 1st, 1979). p. 200-202.
"Majoon-E-Moosli Paak", Database Traditional Knowledge Digital Library, Database accession No. MA3/629, Mohammad Kabiruddin; Bayaaz-e-Kabir, vol. II (Compiled), Daftar-al-Maseeh, Karol Bagh, New Delhi, 1938 AD p. 173-174.
"SANOOBAR", Database Traditional Knowledge Digital Library, Database accession No. AA21/87E, Abu Bakr Mohammad.Bin Zakariyya Al-Razi; Kitaab-al-Haawi-fil-Tibb, vol. XXI Part I ($9^{th}$ century AD), Dayerah-al-Ma'aarif Usmania, Hyderabad, (First Edition) 1968 AD p. 128.
"Vasantakusumakararasa", Database Traditional Knowledge Digital Library, Data-base accession No. AK9/717, Cuadmarii; Rasakamadhenu Sarhhita—Edited by Jivaramakalidasa Sastri, Part 4, Chaukhambha Publishers, Varanasi, Edn. 1st 1992 p. 235.
"Rasayanaristah", Database Traditional Knowledge Digital Library, Database accession No. RS/992, Sodhala; Gadanigrahah ed,Ganga Sahaya Pandeya & Corn.-Indradeva Tripathi,Part-I(Prayoga 2 Khanda) Chaukhamba Sanskrit Sansthan, Varanasi, Ed. 3rd 1999 p. 392.
"Baladi Ausadh", Database Traditional Knowledge Digital Library, Database accession No. AJ/697, Harita; Harita Samhita—Translated by Hariharaprasada Tripathi, Chaukhambha Krishnadas Academy (Varanasi), Ed. 1st 2005 p. 352-353.
International Search Report for PCT/CA2008/001001, Filed on May 23, 2008, Applicant: Lignol Innovations Ltd. et al., dated Aug. 8, 2008, 4 pages.
International Search Report for PCT/CA2010/000205, Filed on Feb. 15, 2010, Applicant: Lignol Innovations Ltd. et al., dated Jun. 1, 2010, 5 pages.
International Search Report for PCT/CA2010/000209, Filed on Feb. 15, 2010, Applicant: Lignol Innovations Ltd. et al., dated May 14, 2010, 4 pages.
International Search Report for PCT/CA2010/000210, Filed on Feb. 15, 2010, Applicant: Lignol Innovations Ltd. et al., dated May 31, 2010, 4 pages.
Argyropoulos, D.S. et al., "Isolation of Residual Kraft Lignin in High Yield and Purity," Journal of Pulp and Paper Science 2002, 28, 2, pp. 50-54.
Asgari, F. et al., "Fundamentals of oxygen delignification. Part II. Functional group formation/elimination in residual kraft lignin," Can. J. Chem. 1998, 76, pp. 1606-1615.
Cateto, C.A. et al., "Lignins as a Macromonomers for Polyurethane Synthesis: A Comparative Study on Hydroxyl Group Determination," Journal of Applied Polymer Science 2008, 109, pp. 3008-3017.
Catignani, G.L. et al., "Antioxidant Properties of Lignin," Journal of Food Science 1982, vol. 47, 2 pages.
Chakar, F.S. et al., "Biobleaching chemistry of laccase-mediator systems on high-lignin-content kraft pulps," Can. J. Chem. 2004, 82, pp. 344-352.
Chakar, F.S. et al., "Laccase-Lignin Reactions," IPST Technical Paper Series No. 876, Institute of Paper Science and Technology, Aug. 2000, 6 pages.
Colodette, J.L. et al., "Influence of pulping conditions on eucalyptus kraft pulp yield, quality, and bleachability," TAPPI Journal 2002, pp. 14-20.
Crestini, C. et al., "Structural Analysis of Wheat Straw Lignin by Quantitative 31P and 2D NMR Spectroscopy. The Occurrence of Ester Bonds and α-O-4 Substructures," J.Agric. Food Chem., 1997, 45, pp. 1212-1219.
Dizhbite, T. et al., "Characterization of the radical scavenging activity of lignins—natural antioxidants," Bioresource Technology 2004, 95, pp. 309-317.
Froass, P.M. et al., "Nuclear Magnetic Resonance Studies. 4. Analysis of Residual Lignin after Kraft Pulping," Ind. Eng. Chem. Res. 1998, 37, pp. 3388-3394.
Gellerstedt. G. et al., "Chemical Structures Present in Biofuel Obtained from Lignin," Energy & Fuels 2008, 22, pp. 4240-4244.
Gregorova, A. et al., "Stabilization effect of lignin in polypropylene and recycled polypropylene," Polymer Degradation and Stability 2005, 89, pp. 553-558.
Jaaskelainen, A.S. et al., "The effect of isolation method on the chemical structure of residual lignin," Wood Sci Technol 2003, 37, pp. 91-102.
Kasprzycka-Guttman, T., et al., "Antioxidant properties of lignin and its fractions," Thermochimica Acta 1994, 231, pp. 161-168.
Kosikova, B. et al., "Lignin-Stimulated Protection of Polypropylene Films and DNA in Cells of Mice against Oxidation Damage," BioResources May 2009, 4(2), pp. 805-815.
Kubo, S. et al., "Hydrogen Bonding in Lignin: A Fourier Transform Infrared Model Compound Study," Biomacromolecules 2005, 6, pp. 2815-2821.
Kubo, S. et al., "Kraft Lignin/Poly (ethylene oxide) Blends: Effect of Lignin Structure on Miscibility and Hydrogen Bonding," Journal of Applied Polymer Science 2005, 98, 1437-1444.
Kubo, et al.; "Lignin-Based Carbon Fibers: Effect of Synthetic Polymer Blending of Fiber Properties"; Journal of Polymers and the Environment; vol. 13, No. 2, 97-105 (Apr. 1, 2005).
Lucia, L.A. et al., "Comparative Evaluation of Oxygen Delignification Processes for Low- and High-Lignin-Content Softwood Kraft Pulps," Ind. Eng. Chem. Res. 2002, 41, pp. 5171-5180.
Megiatto, J.D. et al., "Sisal Fibers: Surface Chemical Modification Using Reagent Obtained from a Renewable Source; Characterization of Hemicellulose and Lignin as Model Study," J. Agric. Food Chem. 2007, 55, pp. 8576-8584.
Nieminen, M.O.J. et al., "Determination of Hydroxyl Groups in Kraft Pine Lignin by Silicon-29 NMR Spectroscopy," Holzforschung 1989, 43, pp. 303-307.
Pan, et al.; "Biorefining of Sotwoods Using Ethanol Organosolv Pulping"; Biotechnology and Bioengineering; vol. 90, No. 4 (May 20, 2005).
Pan et al., "Orgaosolv Ethanol Lignin from Hybrid Poplar as a Radical Scavenger: Relationship between Lignin Structure, Extraction Conditions, and Antioxidant Activity," J. Agric. Food Chem., 2006, 54, 5806-5813.
Pu, Y. et al., "Investigation of the photo-oxidative chemistry of acetylated softwood lignin," Journal of Photochemistry and Photobiology: A Chemistry 163, 2004, pp. 215-221.
Arlt, H. G., et al., "Lignin structure. VIII. characterization of ethanol spruce lignin prepared by a new method," J. Am. Chem. Soc.,1954, 78, 1904-1906.
Kadla, J. F., et al., "Lignin-based carbon fibers for composite fiber applications," Carbon, 2002, 40, 2913-2920.
Kubo, S., et al., "Poly(ethylene oxide)/organosolv lignin blends: relationship between thermal properties, chemical structure, and blend behavior," Macromolecules, 2004, 37, 6904-6911.
Pu, Y. et al., "Structural analysis of acetylated hardwood lignins and their photoyellowing properties," Can. J. Chem. 2005, 83, pp. 2132-2139.
Ruiz-Rosas, et al.; "The Production of Submicron Diameter Carbon Fibers by the Electrospinning of Lignin"; Carbon, Elsevier, Oxford, GB; vol. 48, No. 3, pp. 696-705 (Mar. 1, 2010).

(56) References Cited

OTHER PUBLICATIONS

Sealey, J et al., "Residual Lignin Studies of Laccase Delignified Kraft Pulps," IPST Technical Paper Series, No. 621, Institute of Paper Science and Technology, Aug. 1996, 7 pages.

Tohmura, Shin-ichiro et al., "Determination of Arylglycerol-β-aryl Ethers and Other Linkages in Lignins Using DFRC/31P NMR," J. Agric. Food Chem. 2001, 49, pp. 536-542.

Vinardell, M.P. et al., "Potential applications of antioxidant lignins from different sources," Industrial Crops and Products 2008, pp. 220-223.

Wu, S. et al., "An Improved Method for Isolating Lignin in High Yield and Purity," Journal of Pulp and Paper Science Jul. 2003, vol. 29, No. 7, pp. 235-240.

Yang, R. et al., "Oxygen Degradation and Spectroscopic Characterization of Hardwood Kraft Lignin," Ind. Eng. Chem. Res. 2002, 41, pp. 5941-5948.

Zawadzki, M. et al., "N-Hydroxy Compounds as New Internal Standards for the 31P-NMR Determination of Lignin Hydroxy Functional Groups," Holzforschung 2001, 55, 3, pp. 283-285.

European Search Report of European Application No. 11741789.9 dated Oct. 16, 2013.

International Search Report and Written Opinion dated Jun. 2, 2011 for PCT/CA2011/000184.

International Preliminary Report on Patentability dated Aug. 30, 2013 for PCT/CA2011/000184.

Del Rio et al., "Occurrence of Naturally Acetylated Lignin Units." Journal of Agricultural and Food Chemistry 55.14, 2007: 5461-5468.

Danielle R. Robert et al., "Structural Changes in Lignin During Kraft Cooking Part 3", Journal of Wood Chemistry and Technology, vol. 4, 1984—Issue 3, 1984, p. 239-263.

\* cited by examiner

CARBON FIBRE COMPOSITIONS COMPRISING LIGNIN DERIVATIVES

This application is a continuation of U.S. application Ser. No. 13/584,616, filed Aug. 13, 2012; which is a continuation of PCT/CA2011/000184, filed Feb. 15, 2011; which claims the priority of U.S. Provisional Application No. 61/304,752, filed Feb. 15, 2010. The contents of the above-identified applications are incorporated herein by reference in their entirety.

TECHNICAL FIELD

This disclosure relates to derivatives of native lignin recovered from lignocellulosic feedstocks, and applications thereof. More particularly, this disclosure relates to compositions, uses, processes and methods utilizing derivatives of native lignin.

BACKGROUND

Native lignin is a naturally occurring amorphous complex cross-linked organic macromolecule that comprises an integral component of all plant biomass. The chemical structure of lignin is irregular in the sense that different structural units (e.g., phenylpropane units) are not linked to each other in any systematic order. It is known that native lignin comprises pluralities of two monolignol monomers that are methoxylated to various degrees (trans-coniferyl alcohol and trans-sinapyl alcohol) and a third non-methoxylated monolignol (trans-p-coumaryl alcohol). Various combinations of these monolignols comprise three building blocks of phenylpropanoid structures i.e. guaiacyl monolignol, syringyl monolignol and p-hydroxyphenyl monolignol, respectively, that are polymerized via specific linkages to form the native lignin macromolecule.

Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e. hardwood lignins, softwood lignins, and annual fibre lignins.

Native lignins are partially depolymerized during the pulping processes into lignin fragments which are soluble in the pulping liquors and subsequently separated from the cellulosic pulps. Post-pulping liquors containing lignin and polysaccharide fragments, and extractives, are commonly referred to as "black liquors" or "spent liquors", depending on the pulping process. Such liquors are generally considered a by-product, and it is common practice to combust them to recover some energy value in addition to recovering the cooking chemicals. However, it is also possible to precipitate and/or recover lignin derivatives from these liquors. Each type of pulping process used to separate cellulosic pulps from other lignocellulosic components produces lignin derivatives that are very different in their physico-chemical, biochemical, and structural properties.

Given that lignin derivatives are available from renewable biomass sources there is an interest in using these derivatives in certain industrial processes. For example, U.S. Pat. No. 5,173,527 proposes using lignin-cellulosic materials in phenol-formaldehyde resins. A. Gregorova et al. propose using lignin in polypropylene for it radical scavenging properties (A. Gregorova et al., Radical scavenging capacity of lignin and its effect on processing stabilization of virgin and recycled polypropylene, Journal of Applied Polymer Science 106-3 (2007) pp. 1626-1631). However, large-scale commercial application of the extracted lignin derivatives, particularly those isolated in traditional pulping processes employed in the manufacture of pulp and paper, has been limited due to, for example, the inconsistency of their chemical and functional properties. This inconsistency may, for example, be due to changes in feedstock supplies and the particular extraction/generation/recovery conditions. These issues are further complicated by the complexity of the molecular structures of lignin derivatives produced by the various extraction methods and the difficulty in performing reliable routine analyses of the structural conformity and integrity of recovered lignin derivatives.

Carbon fibres are known to have certain mechanical and physio-chemical properties that make them useful in many applications. For example, carbon fibres may have high tensile strength, low density, low weight, and/or low thermal expansion. Individual strands of carbon fibres can be twisted together to form a yarn that can be used by itself or woven into fabrics. Carbon fibre yarns can also be combined with plastic resins that can be wound or molded to form composite materials such as carbon fibre-reinforced plastics. However, while carbon fibre-containing composites may have certain advantages over similarly sized steel materials, they are usually much more costly because of the high cost of manufacturing carbon fibres.

Carbon fibres are generally manufactured by carbonization of polymerized acrylonitrile (polyacrylonitrile). Polyacrylonitrile is converted to carbon fibres with a multistep process wherein the first step is heating the polyacrylonitrile to 300° C. to break the hydrogen bonds and add oxygen molecules thereby creating a fireproof and stable material. This new material is then carbonized by heating to between 1,500° C. and 3,000° C. in an inert gas resulting in a material that comprises almost 100% carbon. The carbonized material is then surface-treated and sized with an epoxy resin to protect the carbon fibre. Different grades of carbon fibre can be produced by selection of the temperatures for carbonization. For example, carbon fibres that have very high tensile strengths are formed at temperatures between 1,500° C. to 2,000° C. degrees, Carbon fibres with high modulus (i.e., more elasticity) are produced by carbonization at higher temperatures, e.g., up to 3,000° C.

Lignin derivatives recovered from kraft pulping processes (i.e., commercial kraft lignins) and from organosolv processes have been evaluated for production of low-cost carbon fibre that may be used to partially or completely replace carbon fibres produced from polyacrylonitrile. For example, U.S. Pat. No. 3,461,082 proposed a method for producing a carbonized lignin fiber from alkali-lignins, thiolignins, or ligninsulfonates. J. F. Kadla et al. proposed using commercial kraft lignin for production of carbon fibres (J. F. Kadla et al., 2002, Lignin-based carbon fibers for composite fiber applications, Carbon 36: 1119-1124). S. Kubo et al. proposed using acetic acid organosolv lignin for production of carbon fibres (S. Kubo et al., 1998, Preparation of Carbon Fibers from Softwood Lignin by Atmospheric Acetic Acid Pulping, Carbon 36: 1119-1124). Unfortunately, in each of these systems, production costs have not significantly decreased because of the purification steps required to remove volatiles, ash and particulates. Furthermore, purified lignins required the addition of co-polymers and plasticizers to form carbon fibres. S. Kubo et al. proposed using Alcell® organosolv lignin for production of carbon fibres (S. Kubo et al., 2004, Poly(Ethylene Oxide)/ Organosolv Lignin Blends: Relationship Between Thermal Properties, Chemical Structures, and Blend Behaviour, Macromolecules 37: 6904-6911). However, they found that while a small amount of Alcell® lignin increased the crystallinity of poly(ethylene oxide), incorporating more than 25% Alcell® lignin hindered crystallinity and crystalline domain size. Other investigators have suggested using lignin derivatives in carbon fibre compositions. See, for example, U.S. Pat. No. 6,765,028; WO2009/028969; U.S. Pat. Nos. 7,678,358; 5,344,921; US2010/0311943.

SUMMARY

The present disclosure provides derivatives of native lignin suitable for production of carbon fibres wherein the derivatives of native lignin have a certain alkoxy content and/or a certain carbon content. The present lignin derivatives can have acceptable spinnability performance characteristics for producing carbon fibres having acceptable tensile strengths and acceptable modulus of elasticity.

DETAILED DESCRIPTION

The present disclosure provides derivatives of native lignin having certain alkoxy contents. and/or certain carbon contents. While not wishing to be bound by theory, it is believed that lignin derivatives having higher alkoxy contents and/or carbon contents have acceptable spinnability performance for producing carbon fibres and that the resultant fibres can have acceptable tensile strengths and acceptable modulus of elasticity. Thus, selecting for derivatives of native lignin having a higher alkoxy content and/or higher carbon content can result in a product having better performance characteristics.

The derivatives of native lignin of the present disclosure having an alkoxy content of 0.45 mmol/g or greater and/or carbon content of about 64.5% or greater. For example, alkoxy content of about 0.5 mmol/g or greater; about 0.6 mmol/g or greater; about 0.7 mmol/g or greater; about 0.8 mmol/g or greater; about 0.9 mmol/g or greater; about 1 mmol/g or greater; about 1.1 mmol/g or greater; about 1.2 mmol/g or greater. The present lignin derivatives may, for example, have a carbon content of about 65.0% or greater; about 66.0% or greater; about 67.0% or greater; about 68.0% or greater; about 69.0% or greater.

The lignin derivatives may comprise any suitable alkoxy groups such as $C_1$-$C_6$ alkoxy groups; $C_1$-$C_4$ alkoxy groups; $C_1$-$C_3$ alkoxy groups; methoxy and/or ethoxy; ethoxy. The present lignin derivatives may have an ethoxy content of about 0.5 mmol/g or greater; about 0.6 mmol/g or greater; about 0.7 mmol/g or greater; about 0.8 mmol/g or greater; about 0.9 mmol/g or greater; about 1 mmol/g or greater; about 1.1 mmol/g or greater; about 1.2 mmol/g or greater. The present lignin derivatives may, for example, have an ethoxy content of about 3.75 mmol/g or less; 3.5 mmol/g or less; 3.25 mmol/g or less; 3 mmol/g or less; 2.75 mmol/g or less; 2.5 mmol/g or less; 2.25 mmol/g or less; 2 mmol/g or less; 1.9 mmol/g or less; 1.8 mmol/g or less; 1.7 mmol/g or less; 1.6 mmol/g or less; 1.5 mmol/g or less; 1.4 mmol/g or less; 1.3 mmol/g or less.

Quantification of the alkoxy groups can be performed using high resolution $^{13}$C NMR spectroscopy. For example, quantification of ethoxyl group content can be performed by high resolution $^{13}$C NMR spectroscopy. Identification of ethoxyl groups can be confirmed by 2D NMR HSQC spectroscopy. 2D NMR spectra may be recorded by a Bruker 700 MHz UltraShield Plus standard bore magnet spectrometer equipped with a sensitive cryogenically cooled 5 mm TCI gradient probe with inverse geometry. The acquisition parameters are as follows: standard Bruker pulse program hsqcetgp, temperature of 298 K, a 90° pulse, 1.1 sec pulse delay (d1), and acquisition time of 60 msec.

Quantification of the carbon (C) contents can be performed by elemental analysis using suitable elemental analysis instruments. For example, samples can be combusted in a pure oxygen environment at 975° C. in a Perkin-Elmer 2400 Series Elemental Analyzer to produce $CO_2$, $H_2O$, $N_2$, and $SO_2$. Trace elements were removed from this gas mixture in a reduction zone at 500° C. The homogenous gas mixture was taken to exactly known volume, temperature, and pressure before being passed through a column on which the constituent gases separated followed by thermal conductivity detection.

The present disclosure provides derivatives of native lignin recovered during or after pulping of lignocellulosic biomass feedstocks. The pulp may be from any suitable lignocellulosic feedstock including hardwoods, softwoods, annual fibres, and combinations thereof.

Hardwood feedstocks include Acacia; Afzelia; *Synsepalum duloificum;* Albizia; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam; Hophornbeam; Ipê; Iroko; Ironwood (e.g. Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata,* Ipe, *Krugiodendron ferreum, Lyonothamnus lyonii (L. floribun-*

*dus*), *Mesua ferrea*, *Olea* spp., *Olneya tesota*, *Ostrya virginiana*, *Parrotia persica*, *Tabebuia serratifolia*); Jacarandá; Jotoba; Lacewood; Laurel; Limba; Lignum vitae; Locust (e.g. *Robinia pseudacacia*, *Gleditsia triacanthos*); Mahogany; Maple (e.g. *Acer saccharum*, *Acer nigrum*, *Acer negundo*, *Acer rubrum*, *Acer saccharinum*, *Acer pseudoplatanus*); Meranti; Mpingo; Oak (e.g. *Quercus macrocarpa*, *Quercus alba*, *Quercus stellata*, *Quercus bicolor*, *Quercus virginiana*, *Quercus michauxii*, *Quercus prinus*, *Quercus muhlenbergii*, *Quercus chrysolepis*, *Quercus lyrata*, *Quercus robur*, *Quercus petraea*, *Quercus rubra*, *Quercus velutina*, *Quercus laurifolia*, *Quercus falcata*, *Quercus nigra*, *Quercus phellos*, *Quercus texana*); Obeche; Okoumé; Oregon Myrtle; California Bay Laurel; Pear; Poplar (e.g. *P. balsamifera*, *P. nigra*, Hybrid Poplar (*Populus×canadensis*)); Ramin; Red cedar; Rosewood; Sal; Sandalwood; Sassafras; Satinwood; Silky Oak; Silver Wattle; Snakewood; Sourwood; Spanish cedar; American sycamore; Teak; Walnut (e.g. *Juglans nigra*, *Juglans regia*); Willow (e.g. *Salix nigra*, *Salix alba*); Yellow poplar (*Liriodendron tulipifera*); Bamboo; Palmwood; and combinations/hybrids thereof.

For example, hardwood feedstocks for the present invention may be selected from acacia, aspen, beech, eucalyptus, maple, birch, gum, oak, poplar, and combinations/hybrids thereof. The hardwood feedstocks for the present invention may be selected from *Populus* spp. (e.g. *Populus tremuloides*), *Eucalyptus* spp. (e.g. *Eucalyptus globulus*), *Acacia* spp. (e.g. *Acacia dealbata*), and combinations/hybrids thereof.

The present disclosure provides lignin derivatives from hardwood biomass wherein the derivatives have an ethoxy content, of from 0.45 mmol/g to about 1.4 mmol/g; about 0.5 mmol/g to about 1.3 mmol/g; about 0.6 mmol/g to about 1.2 mmol/g; and/or a carbon content from about 67.5% to about 75.5%; from about 68.0% to about 72.5%.

Softwood feedstocks include Araucaria (e.g. *A. cunninghamii*, *A. angustifolia*, *A. araucana*); softwood Cedar (e.g. *Jumperus virginiana*, *Thuja plicata*, *Thuja occidentalis*, *Chamaecyparis thyoides Callitropsis nootkatensis*); Cypress (e.g. *Chamaecyparis*, *Cupressus Taxodium*, *Cupressus arizonica*, *Taxodium distichum*, *Chamaecyparis obtusa*, *Chamaecyparis lawsoniana*, *Cupressus sempervirens*); Rocky Mountain Douglas fir; European Yew; Fir (e.g. *Abies balsamea*, *Abies alba*, *Abies procera*, *Abies amabilis*); Hemlock (e.g. *Tsuga canadensis*, *Tsuga mertensiana*, *Tsuga heterophylla*); Kauri; Kaya; Larch (e.g. *Larix decidua*, *Larix kaempferi*, *Larix laricina*, *Larix occidentalis*); Pine (e.g. *Pinus nigra*, *Pinus banksiana*, *Pinus contorta*, *Pinus radiata*, *Pinus ponderosa*, *Pinus resinosa*, *Pinus sylvestris*, *Pinus strobus*, *Pinus monticola*, *Pinus lambertiana*, *Pinus taeda*, *Pinus palustris*, *Pinus rigida*, *Pinus echinata*); Redwood; Rimu; Spruce (e.g. *Picea abies*, *Picea mariana*, *Picea rubens*, *Picea sitchensis*, *Picea glauca*); Sugi; and combinations/hybrids thereof.

For example, softwood feedstocks which may be used herein include cedar; fir; pine; spruce; and combinations thereof. The softwood feedstocks for the present invention may be selected from loblolly pine (*Pinus taeda*), *radiata* pine, jack pine, spruce (e.g., white, interior, black), Douglas fir, *Pinus silvestris*, *Picea abies*, and combinations/hybrids thereof. The softwood feedstocks for the present invention may be selected from pine (e.g. *Pinus radiata*, *Pinus taeda*); spruce; and combinations/hybrids thereof.

The present disclosure provides lignin derivatives from softwood biomass wherein the derivatives have an ethoxy content, of from about 0.35 mmol/g to about 1.4 mmol/g; about 0.45 mmol/g to about 1.3 mmol/g; about 0.5 mmol/g to about 1.2 mmol/g; about 0.6 mmol/g to about 1.1 mmol/g; and/or a carbon content from 66.5% to about 80.0%; from about 67.0% to about 75.5%; from about 67.5% to about 73.5%.

Annual fibre feedstocks include biomass derived from annual plants, plants which complete their growth in one growing season and therefore must be planted yearly. Examples of annual fibres include: flax, cereal straw (wheat, barley, oats), sugarcane bagasse, rice straw, corn stover, corn cobs, hemp, fruit pulp, alfa grass, switchgrass, and combinations/hybrids thereof. Industrial residues like corn cobs, corn fibre, distillers' dried grains (DDGs), fruit peals, seeds, etc. may also be considered annual fibres since they are commonly derived from annual fibre biomass such as edible crops and fruits. For example, the annual fibre feedstock may be selected from wheat straw, corn stover, corn cobs, sugar cane bagasse, and combinations/hybrids thereof.

The present disclosure provides lignin derivatives from annual fibre biomass wherein the derivatives have an alkoxy content, such as ethoxy content, of from about 0.25 mmol/g to about 1.4 mmol/g; about 0.35 mmol/g to about 1.3 mmol/g; about 0.45 mmol/g to about 1.2 mmol/g; about 0.5 mmol/g to about 1.1 mmol/g; and/or a carbon content from 64.5% to about 75.5%; from about 65.0% to about 72.5%; from about 65.5% to about 70.5%.

The derivatives of native lignin will vary with the type of process used to separate native lignins from cellulose and other biomass constituents. Any suitable process may be used herein but it should be noted that kraft pulping, sulphite pulping, and ASAM organosolv pulping will generate derivatives of native lignin containing significant amounts of organically-bound sulphur which may make them unsuitable for certain uses.

Organosolv processes, such as the Alcell® process, can be used to separate highly purified lignin derivatives and other useful materials from biomass without excessively altering or damaging the native lignin building blocks. Such processes can, therefore, be used to maximize the value from all the components making up the biomass.

A description of the Alcell® process can be found in U.S. Pat. No. 4,764,596 (herein incorporated by reference). The process generally comprises pulping or pre-treating a fibrous biomass feedstock with primarily an ethanol/water solvent solution under conditions that include: (a) 60% ethanol/40% water, (b) temperature of about 180° C. to about 210° C., (c) pressure of about 20 atm to about 35 atm, and (d) a processing time of 5-120 minutes. Derivatives of native lignin are fractionated from the native lignins into the pulping liquor which also receives solubilised hemicelluloses, other carbohydrates and other extractives such as resins, organic acids, phenols, and tannins. Organosolv pulping liquors comprising the fractionated derivatives of native lignin and other extractives from the fibrous biomass feedstocks, are often called "black liquors". The organic acid and extractives released by organosolv pulping significantly acidify the black liquors to pH levels of about 5 and lower. After separation from the cellulosic pulps produced during the pulping process, the derivatives of native lignin are recovered from the black liquors by depressurization followed by flashing with cold water which will cause the fractionated derivatives of native lignin to precipitate thereby enabling their recovery by standard solids/liquids separation processes. Various disclosures exemplified by U.S. Pat. No. 7,465,791 and PCT Patent Application Publication No. WO 2007/129921, describe modifications to the Alcell organosolv process for the purposes of increasing the yields of fractionated derivatives of native lignin recovered from fibrous biomass feedstocks during biorefining. Modifications to the Alcell organosols process conditions included adjusting: (a) ethanol concentration in the pulping liquor to a value selected from a range of 35%-85% (w/w) ethanol, (b) temperature to a value selected from a range of 100° C. to 350° C., (c) pressure to a value selected from a range of 5 atm to 35 atm, and (d) processing time to a duration from a range of 20 minutes to about 2 hours or longer, (e) liquor-to-wood ratio of 3:1 to 15:1 or higher, (f) pH of the cooking liquor from a range of 1 to 6.5 or higher if a basic catalyst is used.

The present disclosure provides a process for producing derivatives of native lignin, said process comprising:
  (a) pulping a fibrous biomass feedstock with an organic solvent/water solution,
  (b) separating the cellulosic pulps or pre-treated substrates from the pulping liquor or pre-treatment solution,
  (c) recovering derivatives of native lignin.

The organic solvent may be selected from short chain primary and secondary alcohols, such as such as methanol, ethanol, propanol, and combinations thereof. For example, the solvent may be ethanol. The liquor solution may comprise about 20%, by weight, or greater, about 30% or greater, about 50% or greater, about 60% or greater, about 70% or greater, of ethanol.

Step (a) of the process may be carried out at a temperature of from about 100° C. and greater, or about 120° C. and greater, or about 140° C. and greater, or about 160° C. and greater, or about 170° C. and greater, or about 180° C. and greater. The process may be carried out at a temperature of from about 300° C. and less, or about 280° C. and less, or about 260° C. and less, or about 240° C. and less, or about 220° C. and less, or about 210° C. and less, or about 205° C. and less, or about 200° C. and less.

Step (a) of the process may be carried out at a pressure of about 5 atm and greater, or about 10 atm and greater, or about 15 atm and greater, or about 20 atm and greater, or about 25 atm and greater, or about 30 atm and greater. The process may be carried out at a pressure of about 150 atm and less, or about 125 atm and less, or about 115 atm and less, or about 100 atm and less, or about 90 atm and less, or about 80 atm and less.

The fibrous biomass may be treated with the solvent solution of step (a) for about 1 minute or more, about 5 minutes or more, about 10 minutes or more, about 15 minutes or more, about 30 minutes or more. The fibrous biomass may be treated with the solvent solution of step (a) at its operating temperature for about 360 minutes or less, about 300 minutes or less, about 240 minutes or less, about 180 minutes or less, about 120 minutes or less.

The pH of the pulp liquor may, for example, be from about 1 to about 6, or from about 1.5 to about 5.5.

The present disclosure provides a process for producing a lignin derivative having an alkoxy content of 0.45 mmol/g or greater and/or a carbon content of 64.5% or greater, said process comprising:
  a) pulping or pre-treating a fibrous biomass feedstock in a vessel with an organic solvent/water solvent solution to form a liquor, wherein:
    i. the solution comprises about 30% or greater, by weight, of organic solvent; and
    ii. the pH of the liquor is from about 1 to about 6;
  b) heating the liquor to about 100° C. or greater;
  c) maintaining the elevated temperature for 1 minute or longer;
  d) separating the cellulosic pulps from the pulp liquor
  e) recovering derivatives of native lignin.

The present disclosure provides a process for producing a hardwood lignin derivative having an alkoxy content of 0.45 mmol/g or greater result, said process comprising:
  a) pulping or pre-treating a fibrous feedstock comprising hardwood biomass in a vessel with an organic solvent/water solvent solution to form a liquor, wherein:
    i. the solution comprises about 30% or greater, by weight, of organic solvent; and
    ii. the pH of the liquor is from about 1 to about 6;
  b) heating the liquor to about 100° C. or greater;
  c) maintaining the elevated temperature for 1 minute or longer;
  d) separating the cellulosic pulps from the pulp liquor
  e) recovering derivatives of native lignin.

The present disclosure provides a process for producing a softwood lignin derivative having an alkoxy content of 0.35 mmol/g or greater result, said process comprising:
  a) pulping or pre-treating a fibrous feedstock comprising softwood biomass in a vessel with an organic solvent/water solvent solution to form a liquor, wherein:
    i. the solution comprises about 30% or greater, by weight, of organic solvent; and
    ii. the pH of the liquor is from about 1 to about 6;
  b) heating the liquor to about 100° C. or greater;
  c) maintaining the elevated temperature for 1 minute or longer;
  d) separating the cellulosic pulps from the pulp liquor
  e) recovering derivatives of native lignin.

The present disclosure provides a process for producing an annual fibre lignin derivative having an alkoxy content of 0.25 mmol/g or greater result, said process comprising:
  a) pulping or pre-treating a fibrous feedstock comprising annual fibre biomass in a vessel with an organic solvent/water solvent solution to form a liquor, wherein:
    i. the solution comprises about 30% or greater, by weight, of organic solvent; and
    ii. the pH of the liquor is from about 1 to about 5.5;
  b) heating the liquor to about 100° C. or greater;
  c) maintaining the elevated temperature and pressure for 1 minute or longer;
  d) separating the cellulosic pulps from the pulp liquor
  e) recovering derivatives of native lignin.

Figure 1:
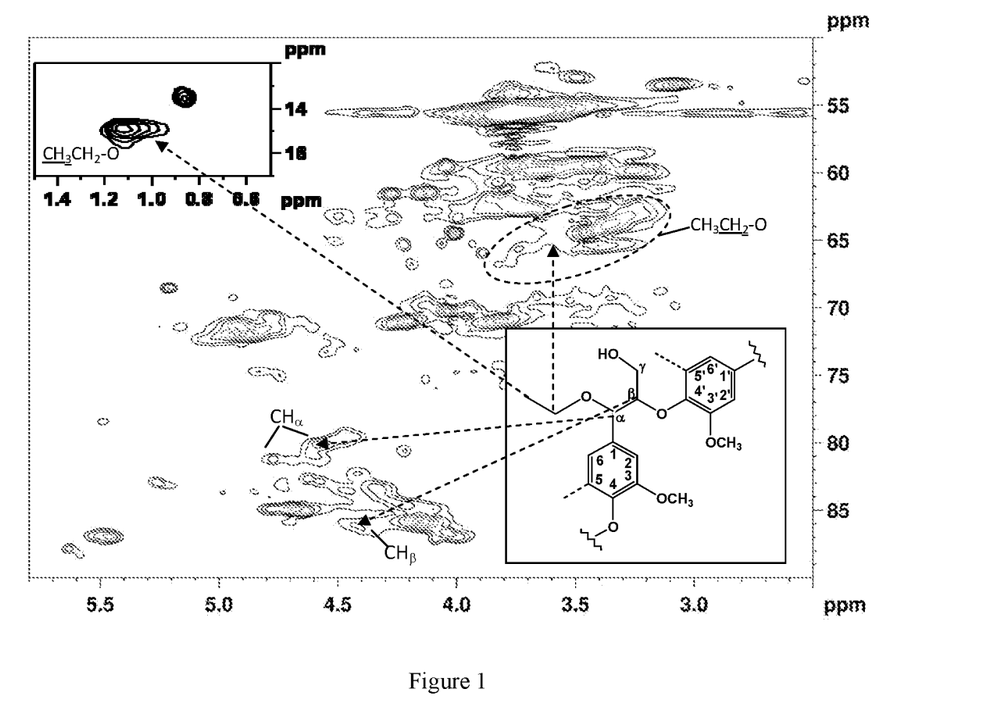
FIG. 1 shows the HSQC spectrum of non-acetylated hardwood lignin derivatives (arrows indicate the signals corresponding to the ethoxyl groups).
Figure 2:
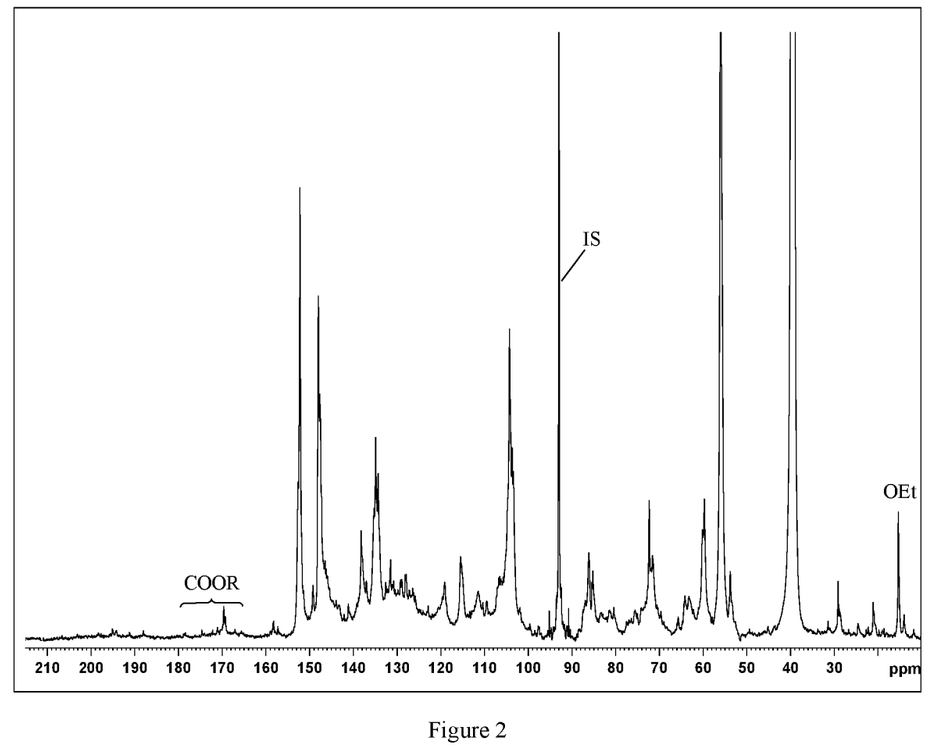
FIG. 2 shows the quantitative $^{13}$C NMR spectrum of non-acetylated hardwood lignin derivatives.
Figure 3:
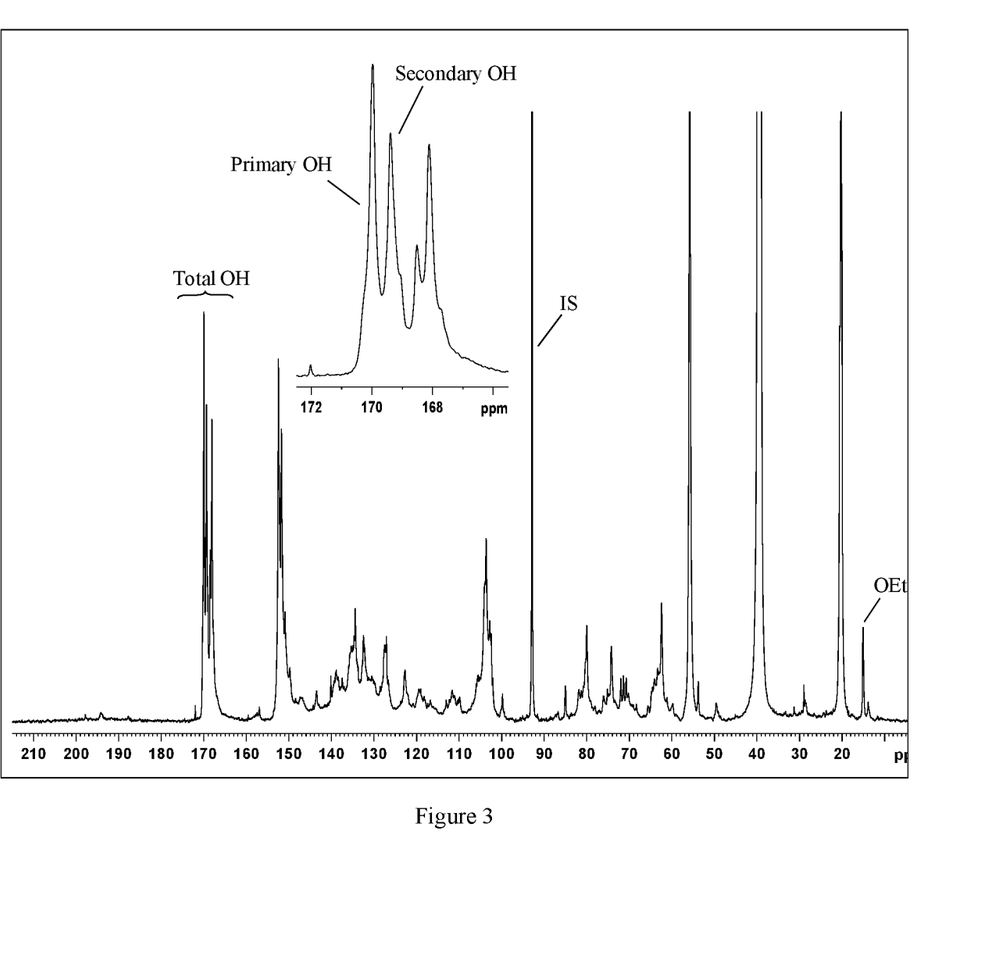
FIG. 3 shows the quantitative $^{13}$C NMR spectrum of acetylated hardwood lignin derivatives.
Figure 4:
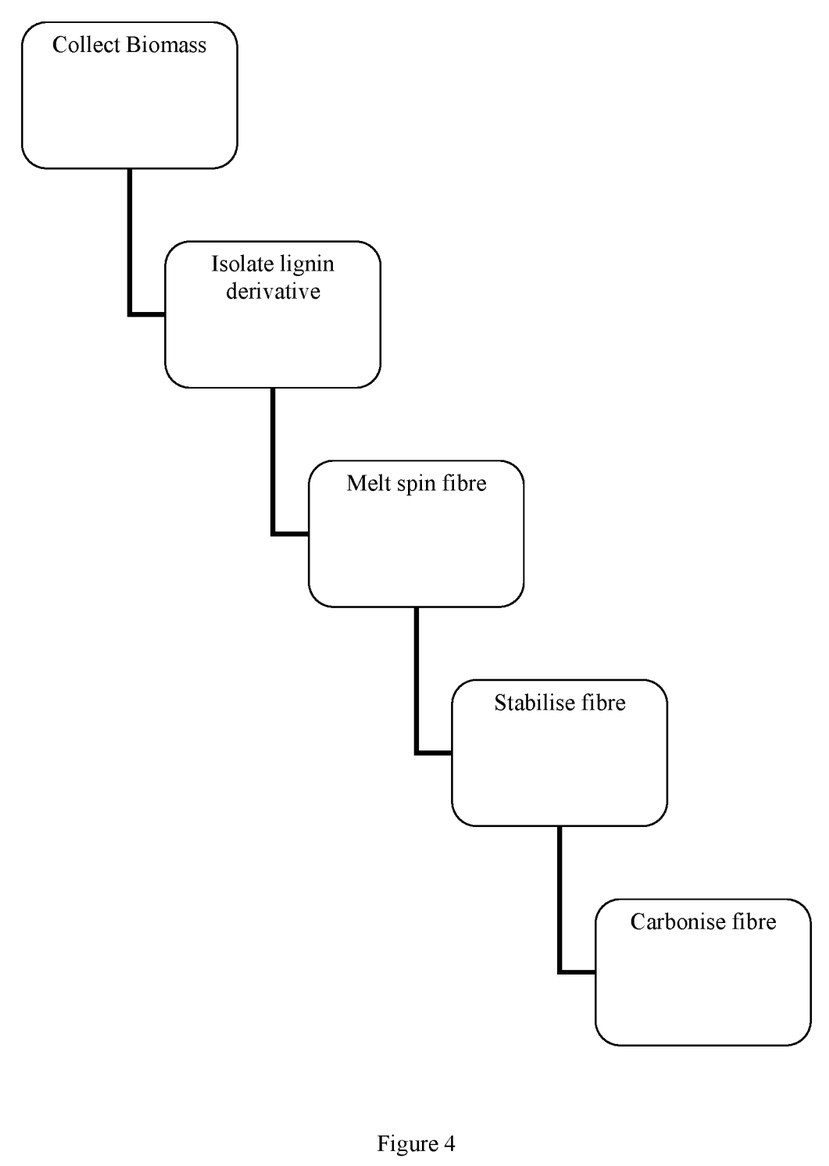
FIG. 4 shows a flow-chart of the key stages of manufacturing a carbon fibre.

The derivatives of native lignin herein may be incorporated into carbon fibres. A flow chart of one embodiment of a method for producing carbon fibre with the present derivatives is shown in FIG. 4.

Lignin samples may be placed into suitable thermal mixing extruders equipped with spinnerets. An exemplary suitable spinneret is a 1/32 inch spinneret. Such equipment typically has maximum winding rates of about 74 m*min$^{-1}$ at temperatures from the range of about 130° C. to about 300° C. Other suitable equipment for spinning lignin into fibres are exemplified by fusion spinning machines with mono-hole nozzles. Such equipment when provided with nozzles having 0.30 mm apertures typically have winding rates of about 140-250 m*min$^{-1}$ at temperatures from the range of about 130° C. to about 300° C. Fibres thus produced from the derivatives of native lignin of the present disclosure may be stabilized prior to carbonization. A suitable stabilization method is to gradually heat the fibres to 250° C. and then holding them at this temperature for a period of time. The thermostabilized fibres my then be carbonized in an inert atmosphere at a temperature from the range of about 1000° C. to about 3000° C.

The derivatives of native lignin may be blended with polyacrylonitrile or other compatible polymers prior to extrusion of fibres. The lignin derivatives may comprise about 25% of the blend or greater; about 30% or greater; about 35% or greater; about 40% or greater; about 45% or greater; about 50% or greater. The fibres comprising a blend of polyacrylonitrile or other compatible polymers and the lignin derivatives, can then be thermostabilized and carbonized.

Carbon fibres comprising the derivatives of native lignin of the present disclosure or a blend of polyacrylonitrile or other compatible polymers and the lignin derivatives of the present disclosure may be used to reinforce composite materials comprising polymers. They may also be used to reinforce non-polymer materials. The fibres may also be woven into fabrics and textiles.

It is contemplated that any embodiment discussed in this specification can be implemented or combined with respect to any other embodiment, method, composition or aspect of the invention, and vice versa.

Unless defined otherwise, all technical and scientific terms used herein have the same meaning as is commonly understood by one of ordinary skill in the art to which this invention belongs. Unless otherwise specified, all patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference. Citation of references herein is not to be construed nor considered as an admission that such references are prior art to the present invention.

Use of examples in the specification, including examples of terms, is for illustrative purposes only and is not intended to limit the scope and meaning of the embodiments of the invention herein. Numeric ranges are inclusive of the numbers defining the range. In the specification, the word "comprising" is used as an open-ended term, substantially equivalent to the phrase "including, but not limited to," and the word "comprises" has a corresponding meaning.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The present invention will be further illustrated in the following examples. However it is to be understood that these examples are for illustrative purposes only, and should not be used to limit the scope of the present invention in any manner.

EXAMPLES

Example 1

Recovery of Lignin Derivatives from Hardwood Feedstocks

Hardwood feedstock chips were prepared from: (1) aspen (*P. tremuloides*) grown in British Columbia, Canada; (2) acacia (*A. dealbata*) grown in Chile; and (3) eucalyptus (*E. nitens*) grown in Chile. Three samples of each feedstock where were individually pulped using an acid-catalyzed ethanol organosols pulping process wherein a different set of pulping conditions was used for each sample (Tables 1, 2 and 3).

TABLE 1

Pulping conditions for aspen wood chip samples at 6:1 liquor-to-wood ratio.

| Sample # | pH | Time min | Temperature ° C. | Ethanol % | OEt mmol/g | Carbon % |
|---|---|---|---|---|---|---|
| 1 | 2.26 | 63 | 190 | 47 | 0.59 | 68.33 |
| 2 | 2.06 | 27 | 193 | 51 | 0.61 | 69.64 |
| 2 | 2.03 | 104 | 197 | 68 | 0.69 | 71.14 |

TABLE 2

Pulping conditions for *acacia* wood chip samples at 6:1 liquor-to-wood ratio.

| Sample # | pH | Time min | Temperature ° C. | Ethanol % | OEt mmol/g | Carbon % |
|---|---|---|---|---|---|---|
| 4 | 2.11 | 114 | 195 | 43 | 0.45 | 68.16 |
| 5 | 2.00 | 67 | 194 | 58 | 0.67 | 68.21 |
| 6 | 2.01 | 104 | 197 | 68 | 0.76 | 69.35 |

TABLE 3

Pulping conditions for *eucalyptus* wood chip samples at 6:1 liquor-to-wood ratio.

| Sample # | pH | Time min | Temperature ° C. | Ethanol % | OEt mmol/g | Carbon % |
|---|---|---|---|---|---|---|
| 7 | 2.01 | 65 | 196 | 60 | 0.65 | 68.13 |
| 8 | 1.88 | 104 | 197 | 68 | 0.64 | 69.00 |

For each wood chips sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The original lignin content of each fibrous biomass sub-sample was determined using the methods described in National Renewable Energy Laboratory (NREL) Technical Report entitled "Determination of Structural Carbohydrates and Lignin in Biomass"—Laboratory Analytical Procedure (TP-510-42618 (25 Apr. 2008)). Then, after adding the fibrous biomass sample to a pressure vessel (2 L or 7 L Parr reactor (Parr Instrument Company, Moline, Ill., USA)) (100-700 g odw chips), the pH-adjusted ethanol-based pulping solvent was added to the vessel at a 6:1 liquor:wood ratio. The vessel was then pressurized and brought up to the target temperature listed in Tables 1-3 (aspen, acacia, eucalyptus, respectively). The biomass sample was then "cooked" for the specified period of time, after which, the pulping process was stopped. After pulping, the contents of the pressure vessel were transferred to a hydraulic 20 ton manual shop press (Airco, China). The liquor was separated from the solids by first squeezing the pulped materials in the press to express the liquor. The expressed liquor was then filtered through a coarse silk screen to separate expressed chip residues from liquor stream. Next, fine particles were separated out from the liquor stream by filtration through fine filter paper (Whatman No 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to total native lignin (sum of the acid-insoluble lignin and acid-soluble lignin) value determined for the original biomass sample before pulping.

Lignin samples were acetylated by the following steps. First, 300 mg of sample were weighed into Buchi Multivapor P-12 tubes and dried overnight in a vacuum oven at 40° C. After removal from the oven, each stube was sealed with a metal foil-backed cap to prevent the dried sample from absorbing moisture. 1.5 mL pyridine and 1.5 mL acetic anhydride were added to each sample. The tube contents were mixed by a vortex mixer until the lignin was completely dissolved. Sample tubes were left, tightly sealed, in a fumehood for a minimum of two days to allow the acetylation reaction to proceed to completion. At the end of this period, 15 mL of ethanol was added to each sample, followed by rotary evaporation in the Multivapor P-12 at 50° C. under maximum achievable vacuum. Nine subsequent rotary evaportation steps were carried out, each proceeded by addition of acetone (~1-2 mL to dissolve any solid lignin in the tube) and ethanol (15 mL, as before). Once all acetic anhydride and acetic acid had been removed, 2 mL of acetone was added to the tube to dissolve the sample. This solution was transferred by glass pipette to a labeled scintillation vial and the tube washed with a further 0.5-1.0 mL of acetone, which was also transferred to the scintillation vial. To the lignin solution in the scintillation vial was added 2.0-3.0 mL of nanopure water, followed by mixing, to cause the lignin to precipitate out of solution. The vials were dried in a vacuum oven at 40° C. The lignin sample dried into a porous solid which was subsequently ground to a fine powder. Two subsequent steps of addition of 1.0 mL nanopure water and drying were carried out to remove traces of entrained acetone.

Non-acetylated and acetylated lignin samples were weighed into labelled 2.0 mL screw cap glass vials at a target mass of 200 mg and then dried overnight in a 40° C. vacuum oven. Immediately upon removal from the oven, the vials were capped and tightly sealed to ensure sample dryness. The vials were left to cool to room temperature in an evacuated vacuum desiccator before recording weights. Internal standard stock solution was prepared by weighing into a vial 1,3,5-trioxane and chromium acetylacetonate and dissolving in d6-dimethylsulfoxide in respective concentrations of 333.3 mg/mL and 50 mg/mL. To each lignin sample vial was added 600 μL d6-dimethylsulfoxide and the vial placed in the thermomixer at 40° C. and mixed at 1400 rpm until the lignin was fully dissolved. are less soluble than others and require more time in the thermomixer or even vortex mixing. A 60 μL aliquot of the previously prepared stock solution was added to each sample and mixing was continued for a short time to allow for a homogeneous solution. The samples were removed from the thermomixer and allowed to cool to room temperature before transferring 550 μL to labeled NMR tubes.

NMR spectra were recorded on a Bruker 700 MHz spectrometer equipped with Cryoprobe at 300 K using ca 30% solutions of sample in DMSO-$d_6$. Chemical shifts were referenced to TMS (0.0 ppm). To ensure more accurate baseline, especially in the carbonyl region (215-185 ppm), the spectra were recorded the interval 240-(−40) ppm. The following conditions were provided for the quantitative $^{13}$C-NMR:

1. Inverse gate detection
2. a 90° pulse
3. Complete relaxation of all nuclei was achieved by addition of chromium (III) acetylacetonate; a 1.2 s acquisition time and 1.7 s relaxation delay were used.

The spectra were Fourier transformed, phased, calibrated using TMS signals as a reference (0 ppm) and the baseline was corrected by using a polynomial function. The correction of baseline was done using the following interval references to be adjusted to zero: (220-215 ppm)-(185-182 ppm)-(97-92 ppm)-(5-(−20) ppm). No other regions were forced to 0. The signals in the quantitative 13C NMR spectra were assigned on the base of 2D HSQC NMR and known database. After the baseline correction the spectra were integrated using the area of internal standard (IS), trioxane, as the reference. Each spectrum was processed (as described) at least twice to ensure good reproducibility of the quantification. The calculation of the quantity of specific moieties was done as follows:

For non-acetylated lignins: $X$ (mmol/g lignin) $=I_X*m_{IS}/(30m_{Lig}*I_{IS})*1000$ For acetylated lignins: $X$ (mmol/g lignin)$=I_X*m_{IS}/(30m_{Lig}*I_{IS}-42*I_{OHtotal}*m_{IS})*1000$ Where X was the amount of the specific moiety; $I_X$, $I_{IS}$ and $I_{OHtotal}$ were the resonance values of the specific moiety, the internal standard and total OH groups, correspondingly; $m_{Lig}$ and $m_{IS}$ are the masses of the lignin and internal standard. The numerical values for the OEt groups were calculated from the spectra of both acetylated and non-modified (non-acetylated). The data are shown in Tables 1-3. Quantification of the carbon (C) contents were determined by combustion in a pure oxygen environment at 975° C. in a Perkin-Elmer 2400 Series Elemental Analyzer. The data are shown in Tables 1-3.

Example 2

Recovery of Lignin Derivatives from Softwood Feedstocks

Softwood feedstock chips were prepared from: (1) hybrid spruce trees grown in British Columbia, (2) *radiata* pine grown in Chile, and (3) loblolly pine grown in south eastern USA. Three samples from each feedstock were individually pulped using an acid-catalyzed ethanol pulping process wherein a different set of pulping conditions was used for each sample (Tables 4, 5 and 6).

TABLE 4

Pulping conditions for hybrid spruce wood chip samples at 6:1 liquor-to-wood ratio.

| Sample # | pH | Time min | Temperature ° C. | Ethanol % | OEt mmol/g | Carbon % |
|---|---|---|---|---|---|---|
| 9 | 2.88 | 60 | 182 | 62 | 0.97 | 67.51 |
| 10 | 1.72 | 34 | 168 | 43 | 0.56 | 68.71 |
| 11 | 2.60 | 84 | 184 | 76 | 1.34 | 70.17 |

TABLE 5

Pulping conditions for radiata pine wood chip samples at 6:1 liquor-to-wood ratio.

| Sample # | pH | Time min | Temperature °C. | Ethanol % | OEt mmol/g | Carbon % |
|---|---|---|---|---|---|---|
| 12 | 1.73 | 34 | 168 | 43 | 0.54 | 67.62 |
| 13 | 1.92 | 33 | 179 | 57 | 0.67 | 69.13 |
| 14 | 2.04 | 58 | 191 | 46 | 0.58 | 70.58 |

TABLE 6

Pulping conditions for loblolly pine wood chip samples at 6:1 liquor-to-wood ratio.

| Sample # | pH | Time min | Temperature °C. | Ethanol % | OEt mmol/g | Carbon % |
|---|---|---|---|---|---|---|
| 15 | 2.99 | 86 | 186 | 47 | 0.65 | 69.55 |
| 16 | 2.80 | 61 | 188 | 67 | 0.94 | 71.09 |
| 17 | 2.01 | 43 | 189 | 61 | 0.61 | 72.50 |

For each wood chips sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The lignin content of each original fibrous biomass sub-sample was determined using the NREL method (NREL/TP-510-42618 (April 2008)). Then, after adding the fibrous biomass sample to a pressure vessel (2 L or 7 L Parr reactor (Parr Instrument Company, Moline, Ill., USA) (100-700 g odw chips), the pH-adjusted ethanol-based pulping solvent was added to the vessel at a 6:1 liquor:wood ratio. The vessel was then pressurized and brought up to the target temperature listed in Tables 8-10 (spruce, radiata pine, loblolly pine, respectively). The biomass sample was then "cooked" for the specified period of time, after which, the pulping process was stopped. After pulping, the contents of pressure vessel were transferred to a hydraulic 20 ton manual shop press (Airco, China). The liquor was separated from the solids by first squeezing the pulped materials in the press to express the liquor. The expressed liquor was then filtered through a coarse silk screen to separate expressed chip residues from liquor stream. Next, fine particles were separated out from the liquor stream by filtration through fine filter paper (Whatman No 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to the total lignin content (acid-insoluble plus the acid-soluble lignin) determined for the original biomass sample before pulping.

The ethoxy contents and carbon contents of the lignin derivatives samples were determined as described in Example 1, and are shown in Tables 4-6.

Example 3

Recovery of Lignin Derivatives from Annual Fibre Feedstocks

Two sets of annual fibre feedstock materials were prepared from: (1) corn cobs produced in Europe, (2) bagasse produced from sugarcane grown and processed in Brazil, and (3) wheat straw produced in Alberta, Canada. Three samples of the each feedstock were individually pulped using an acid-catalyzed ethanol pulping process based wherein a different set of pulping conditions was used for each sample (Table 7, 8 and 9).

TABLE 7

Pulping conditions for wheat straw samples at 6:1 liquor-to-wood ratio.

| Sample # | pH | Time min | Temperature °C. | Ethanol % | OEt mmol/g | Carbon % |
|---|---|---|---|---|---|---|
| 18 | 2.45 | 79 | 178 | 49 | 0.45 | 65.61 |
| 19 | 1.85 | 70 | 185 | 47 | 0.53 | 67.04 |
| 20 | 2.86 | 90 | 195 | 41 | 0.41 | 68.36 |

TABLE 8

Pulping conditions for sugarcane bagasse samples at 6:1 liquor-to-wood ratio.

| Sample # | pH | Time min | Temperature °C. | Ethanol % | OEt mmol/g | Carbon % |
|---|---|---|---|---|---|---|
| 21 | 2.92 | 88 | 171 | 73 | 0.64 | 65.74 |
| 22 | 2.10 | 28 | 171 | 46 | 0.72 | 67.63 |
| 23 | 2.19 | 61 | 178 | 66 | 0.69 | 69.51 |

TABLE 9

Pulping conditions for corn cob samples at 6:1 liquor-to-wood ratio.

| Sample # | pH | Time min | Temperature °C. | Ethanol % | OEt mmol/g | Carbon % |
|---|---|---|---|---|---|---|
| 24 | 2.14 | 87 | 181 | 66 | 0.53 | 65.57 |
| 25 | 1.85 | 42 | 179 | 51 | 0.55 | 66.25 |
| 26 | 2.18 | 100 | 190 | 67 | 0.54 | 66.83 |

For each biomass sample, the ethanol pulping solvent was prepared to the specified concentration by first, partially diluting the ethanol with water after which, a suitable amount of sulphuric acid was added to achieve the target final acidity. Finally, the ethanol solution was further diluted with water to achieve the target ethanol concentration.

The original lignin content of each fibrous biomass sub-sample was determined using the NREL method (NREL/TP-510-42618 (April 2008)). Then, after adding the fibrous biomass sample to a pressure vessel (2 L or 7 L Parr reactor (Parr Instrument Company, Moline, Ill., USA) (100-700 g odw chips), the pH-adjusted ethanol-based pulping solvent was added to the vessel at a 6:1 liquor:biomass ratio. The vessel was then pressurized and brought up to the target temperature listed in Tables 14-15 (bagasse, corncobs, respectively). The biomass sample was then "cooked" for the specified period of time, after which, the pulping process was stopped. After pulping, the contents of pressure vessel were transferred to a hydraulic 20 ton manual shop press (Aicro, China). The liquor was separated from the solids by first squeezing the pulped materials in the press to express the liquor. The expressed liquor was then filtered through a coarse silk screen to separate expressed chip residues from liquor stream. Next, fine particles were separated out from the liquor stream by filtration through fine filter paper (Whatman No 1). The recovered fine particles represent lignin derivatives that were extracted and self-precipitated out from the liquor during cooling of the pulped biomass. The particulate lignin is herein referred to as self-precipitated lignin derivatives (i.e., "SPL"). The solubilized lignin derivatives still remaining in the filtered liquor were precipitated from by dilution with cold water. The lignin derivatives precipitated by dilution with cold water are referred to as precipitated lignin or "PL". After determination of the dry weights of SPL and PL lignin derivatives, the relative yield of each lignin derivative was determined in reference to the total lignin (sum of acid-insoluble lignin plus acid-soluble lignin) value determined for the original biomass sample before pulping.

The ethoxy contents and carbon contents of the lignin derivatives samples were determined as described in Example 1, and are shown in Tables 4-6.

This disclosure provides methods for production and description of chemical properties of lignin derivatives with enhanced spinnability, improved engineering properties of resulting carbon fibres as measured by their tensile strength and modulus of elasticity. The lignin derivatives in this disclosure can be spun into lignin fibres and subsequently carbonized into carbon fibres at yields exceeding 45%, tensile strength higher than 388-550 MPa, and modulus of elasticity exceeding 30-60 GPa. Spinnability of these lignin derivatives into lignin fibres can exceed 100 m/min.

What is claimed is:

1. A method of producing a carbon fibre composition, comprising the steps of:
    a. melt spinning a lignin derivative into fibres, wherein the lignin derivative is a self-precipitated lignin derivative or a precipitated lignin derivative obtained from biomass by a pulping process and has a carbon content of 66.5 wt % or greater;
    b. stabilizing the fibres; and
    c. carbonizing the fibres.

2. The method according to claim 1, wherein step a. further comprises blending the lignin derivative with polyacrylonitrile prior to melt spinning.

3. The method according to claim 1, wherein the lignin derivative has a carbon content of 68.0 wt. % or greater and an alkoxy content of 0.45 mmol/g or greater.

4. The method according to claim 1, wherein the lignin derivative has a carbon content of 69.5 wt. % or greater.

5. The method according to claim 1, wherein an alkoxy content of the lignin derivative is 0.45 mmol/g to 3.75 mmol/g.

6. The method according to claim 1, wherein the lignin derivative is recovered during or after the pulping process.

7. The method according to claim 1, wherein the biomass comprises hardwood biomass.

8. The method according to claim 1, wherein the lignin derivative is derived from softwood biomass.

9. The method according to claim 1, wherein the lignin derivative is derived from annual fibre biomass.

10. The method according to claim 1, wherein the lignin derivative is derived from biomass comprising *Populus* spp., *Eucalyptus* spp., *Acacia* ssp., or combinations/hybrids thereof.

11. The method according to claim 1, wherein the lignin derivative is biomass comprises *Populus tremuloides, Eucalyptus globulus, Acacia dealbata*, or combinations/hybrids thereof.

12. The method according to claim 1, wherein the biomass comprises pine, spruce or combinations/hybrids thereof.

13. The method according to claim 1, wherein the biomass comprises *Pinus radiata, Pinus taeda*, BC spruce, or combinations/hybrids thereof.

14. The method according to claim 1, wherein the biomass comprises wheat straw, bagasse, corn cobs, or combinations/hybrids thereof.

* * * * *